United States Patent [19]

Kawamata et al.

[11] Patent Number: 5,144,772
[45] Date of Patent: Sep. 8, 1992

[54] METHOD AND APPARATUS FOR ANGULARLY INDEXING A CRANKSHAFT

[75] Inventors: Taisuke Kawamata, Okazaki; Toshio Maruyama, Kariya; Hidetaka Irie, Okazaki; Masayoshi Inoue, Nagoya; Shinji Nishio, Kariya; Koichi Murayama, Toyota, all of Japan

[73] Assignee: Toyoda Koki Kabushiki Kaisha, Kariya, Japan

[21] Appl. No.: 518,948

[22] Filed: May 4, 1990

[30] Foreign Application Priority Data

May 7, 1989 [JP] Japan .................................. 1-114376

[51] Int. Cl.$^5$ .......................... B24B 5/42; B24B 47/22
[52] U.S. Cl. ........................... 51/105 SP; 82/1.11;
82/106; 409/199; 74/813 C; 51/237 CS; 51/216 ND
[58] Field of Search ............... 82/106, 109, 1.11;
51/165.77, 237 CS, 105 SP, 216 ND; 409/199;
74/813 C; 29/6.1, 888.08

[56] References Cited

U.S. PATENT DOCUMENTS

| | | | |
|---|---|---|---|
| 2,813,385 | 11/1957 | Mouer | 51/237 R |
| 3,147,573 | 9/1964 | Flohr, Jr. | 51/105 SP |
| 3,427,760 | 2/1969 | Happel | 51/237 CS |
| 3,537,215 | 11/1970 | Metz et al. | 51/237 CS |
| 3,583,108 | 6/1971 | Oishi | 51/237 CS |
| 3,584,423 | 6/1971 | Hoare | 51/105 SP |
| 3,680,876 | 8/1972 | Okada | 82/109 |
| 3,747,283 | 7/1973 | Price | 51/105 SD |
| 3,878,651 | 4/1975 | Nakada et al. | 51/165.77 |

FOREIGN PATENT DOCUMENTS

| | | | |
|---|---|---|---|
| 28954 | 8/1971 | Japan | 51/105 SP |
| 27312 | 7/1972 | Japan | 51/105 SP |
| 46426 | 11/1972 | Japan | 51/105 SP |
| 21261 | 2/1982 | Japan | 51/237 CS |
| 60-118403 | 6/1985 | Japan . | |
| 62-15970 | 1/1987 | Japan . | |
| 58468 | 3/1989 | Japan | 51/237 CS |

OTHER PUBLICATIONS

Patent Abstracts of Japan; vol. 6, No. 83 (M-130)(961) May 21, 1982, & JP-A-57 21261 (Toyoda Koki K.K.) Feb. 3, 1982.
Patent Abstracts of Japan; vol. 11, No. 188 (M-599)(2635) Jun. 17, 1987, & JP-A-62 15070 (Honda Motor Co., Ltd.) Jan. 23, 1987.

*Primary Examiner*—Larry I. Schwartz
*Assistant Examiner*—Kevin J. Carroll
*Attorney, Agent, or Firm*—Oblon, Spivak, McClelland, Maier & Neustadt

[57] ABSTRACT

An indexing mechanism in a machine tool for selectively positioning plural pin portions of a crankshaft at the machining position aligned with the work spindle, wherein a indexing member engaging with the crankshaft through an engaging pin is rotated by an indexing motor through a gear train. The crankshaft is initially rotated in a first direction until a selected pin portion engages with a rest shoe of a rest device provided on the bed in order to be positioned in a reference angle position, in which the selected pin portion is located at the machining position aligned with a work spindle. The crankshaft is then clamped on the chucking device. After that, the indexing motor is rotated in a second direction opposite to the first direction until the load of the motor exceeds a reference level, so that the influence of a backlash in the gear train and a clearance between the engaging pin and the crankshaft is eliminated. After the completion of a grinding operation on the selected pin portion, the indexing member is thereafter rotated in the second direction by a predetermined amount so as to position a next pin portion in the machining position.

14 Claims, 8 Drawing Sheets

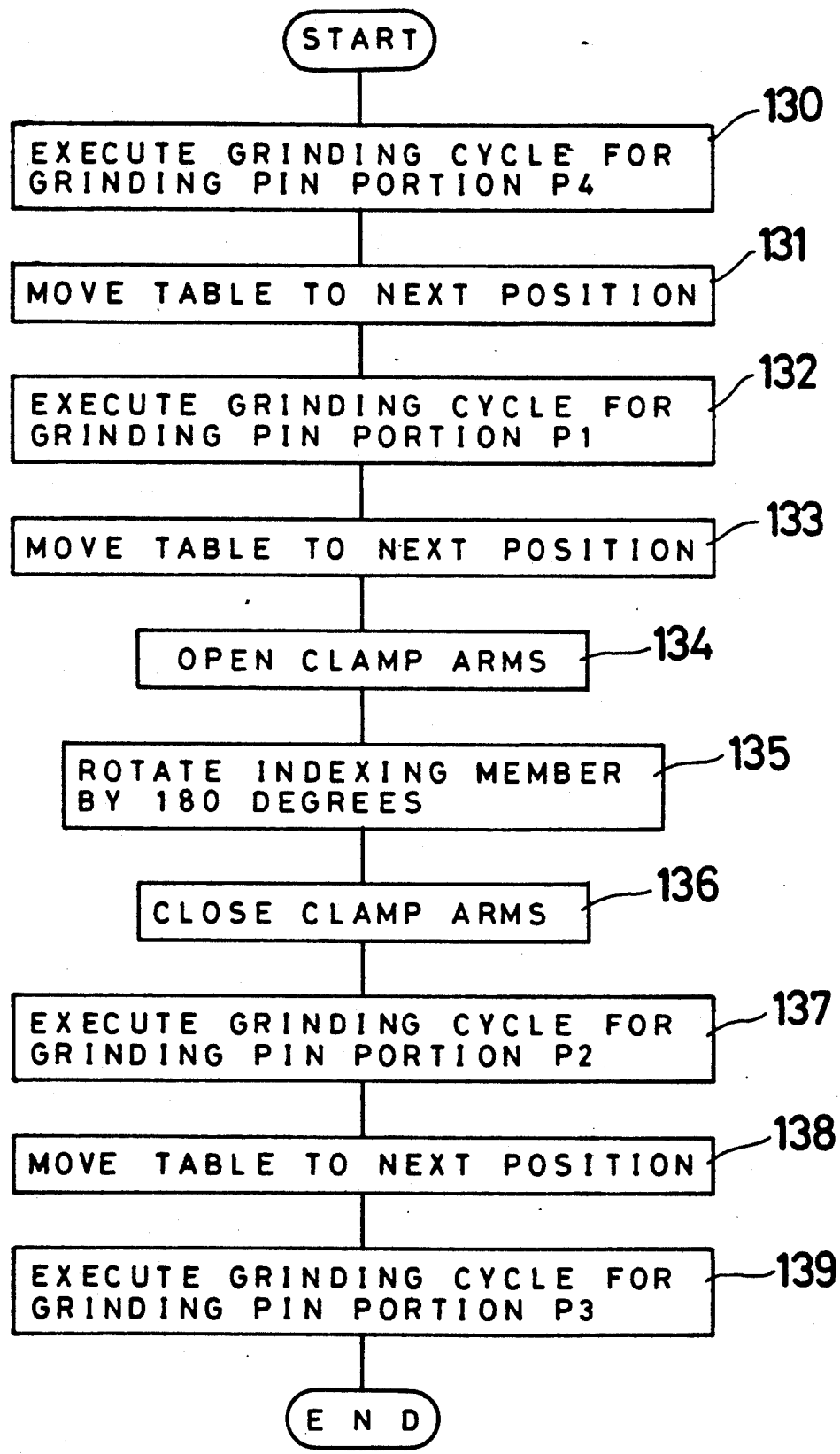

METHOD AND APPARATUS FOR ANGULARLY INDEXING A CRANKSHAFT

BACKGROUND OF THE INVENTION

1. Field of the Invention

The present invention relates to a method and an apparatus for angularly indexing a crankshaft to plural angular positions successively in order to selectively position plural pin portions of the crankshaft in a predetermined machining position aligned with the rotational axis of a work spindle.

2. Discussion of the Prior Art

In a general pin grinder, it is required to index a crankshaft on its chucking device in order to selectively locate plural pin portions thereof at a predetermined machining position, at which the selected pin portion is aligned with the rotational axis of the work spindle, before a clamping operation of the crankshaft with respect to the chucking device. Since the positioning error during the index operation affects the grinding accuracy of the pin portions, the indexing of the crankshaft must be accomplished accurately. Therefore, prior pin grinders are provided with various kinds of indexing mechanisms capable of indexing a crankshaft accurately.

For example, a pin grinder disclosed in the Japanese unexamined patent application 60-118403 is provided with a reference member fixed to its chucking device for engagement with a balance weight portion of a crankshaft, and a swing arm pivoted on its bed for swing movement. In the pin grinder, the swing arm is engaged with one of pin portions in order to rotate the crankshaft about its journal axis until the balance weight portion of the crankshaft engages with the reference member. With this operation, the pin portion is accurately positioned at the machining position aligned with the work spindle.

On the other hand, in a pin grinder disclosed in the Japanese unexamined patent application 57-21261, a shoe of the rest device is used as a reference member, and a pin portion to be positioned in the machining position is engaged with the shoe by a rotational movement of a crankshaft, so that the selected pin portion is located at the machining position.

Although those two pin grinders can index a crankshaft accurately, they have a disadvantage that the total machining cycle time becomes long, because the time consuming indexing operation must be repeated before each grinding operation for respective pin portions.

To obviate above-mentioned problems, a mechanism disclosed in the Japanese unexamined patent application 62-15070 can be used. The pin grinder is provided with a mechanism for indexing a crankshaft with a phase indexing motor and a fine positioning mechanism. In the pin grinder, each of the pin portions are roughly indexed to the machining position by actuating indexing motor, then precisely positioned by actuating the positioning mechanism. Namely, the chucking device is provided with an indexing plate engaging with a hole formed at one end of the crankshaft through an engaging pin, and a positioning piston whose piston rod is engageable with engagement holes formed on the periphery of the indexing plate when the piston is advanced. The indexing plate is first rotated by a predetermined angle by the indexing motor so that one of the pin portions is roughly positioned in the machining position. After that, the positioning piston is advanced so that the piston rod engages with one of engagement holes, resulting in accurate positioning of the crankshaft. After such indexing operation, the crankshaft is clamped with respect to the chucking device. As is understood from the above-explanation, since the pin grinder must be provided with a positioning mechanism, i.e., indexing plate with plural engagement holes and positioning piston, for fine positioning, it has a disadvantage that structure of the chuck device becomes complex. Further, if there is a clearance between the engaging pin and the engagement hole of the crankshaft, pin portions cannot be indexed accurately to the machining position even if the chucking device is provided with the above-mentioned fine indexing mechanism.

SUMMARY OF THE INVENTION

Accordingly, it is an object of the present invention to provide an improved method and apparatus capable of angularly indexing a crankshaft accurately using relatively simple mechanism.

Another object of the present invention is to provide a improved method and apparatus capable of angularly indexing a crankshaft accurately regardless of a clearance between an engaging member fixed to an indexing member and an engagement surface of a crankshaft engaging therewith.

A further object of the present invention is to provide an improved method and apparatus capable of indexing a crankshaft accurately regardless of a backlash in a rotational torque transmission mechanism connecting an indexing motor and an indexing member engaging with a crankshaft as well as a clearance between an engaging member fixed to the indexing member and an engagement surface of a crankshaft engaging therewith.

Briefly, the present invention provides a method and an apparatus for indexing a crankshaft supported by a chucking device of a machine tool, wherein the chucking device is provided with a journal supporting member for supporting a journal portion of the crankshaft at an eccentric position with respect to the rotational axis of a work spindle, an indexing member rotatably supported on the chucking device and having an engaging member engaging with one end of said crankshaft for rotational torque transmission, indexing motor means for generating a rotational torque, a rotational torque transmission mechanism for transmitting the rotational torque from the indexing motor means to the indexing member and a clamp mechanism for clamping the crankshaft with respect to the chucking device.

In the method according to the present invention, the crankshaft is first placed in a predetermined reference angle position, and then clamped with respect to the chucking device with the clamp mechanism. After that, the indexing motor means is rotated in a predetermined direction until the load of said indexing motor means exceeds a predetermined level, and the present position of said indexing member is regarded as the origin of a coordinate system for rotation of said indexing member. Successive index operation of the indexing member is controlled based upon the present position of the indexing member in the coordinate system.

With this method, it is possible to eliminate a backlash in the rotational torque transmission mechanism connecting the indexing member and the indexing motor means and a clearance between the engaging member of the indexing member and an engagement surface of the crankshaft. Accordingly, the plural pin portions of the crankshaft can be positioned in the machining position accurately regardless of the backlash in the transmission mechanism and the clearance between the engaging member and the crankshaft.

In the apparatus according to the present invention, there is provided with clamp control means for actuating the clamp mechanism in order to clamp a crankshaft placed in a predetermined reference angular position, rotation control means for rotating the indexing motor means in a first direction until the load of the indexing motor means exceeds a predetermined level, and indexing control means for rotating the indexing motor means in the first direction, under a condition that the crankshaft is unclamped, so as to rotate the indexing member from the reference angular position by a predetermined amount, so that one of the pin portions is positioned in the machining position aligned with the rotational axis of the work spindle. With this configuration, plural pin portions can be positioned in the machining position accurately regardless of a backlash in the transmission mechanism and a clearance between the indexing member and the crankshaft.

According to another aspect of the present invention, a reference member such as a shoe of a rest device is used for initial positioning of a crankshaft in rotational direction. An indexing member engaging with the crankshaft is rotated in a first direction until a selected pin portion is engaged with the shoe of the rest device so that the crankshaft is precisely positioned in the reference angular position. The crankshaft is then clamped with respect to the chucking device. After that, the indexing member is rotated in a second direction opposite to the first direction until the load of the indexing motor mean reaches a predetermined level. By this rotation in the second direction, a backlash in the transmission mechanism and a clearance between the indexing member and the crankshaft are eliminated.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

Figure 1:
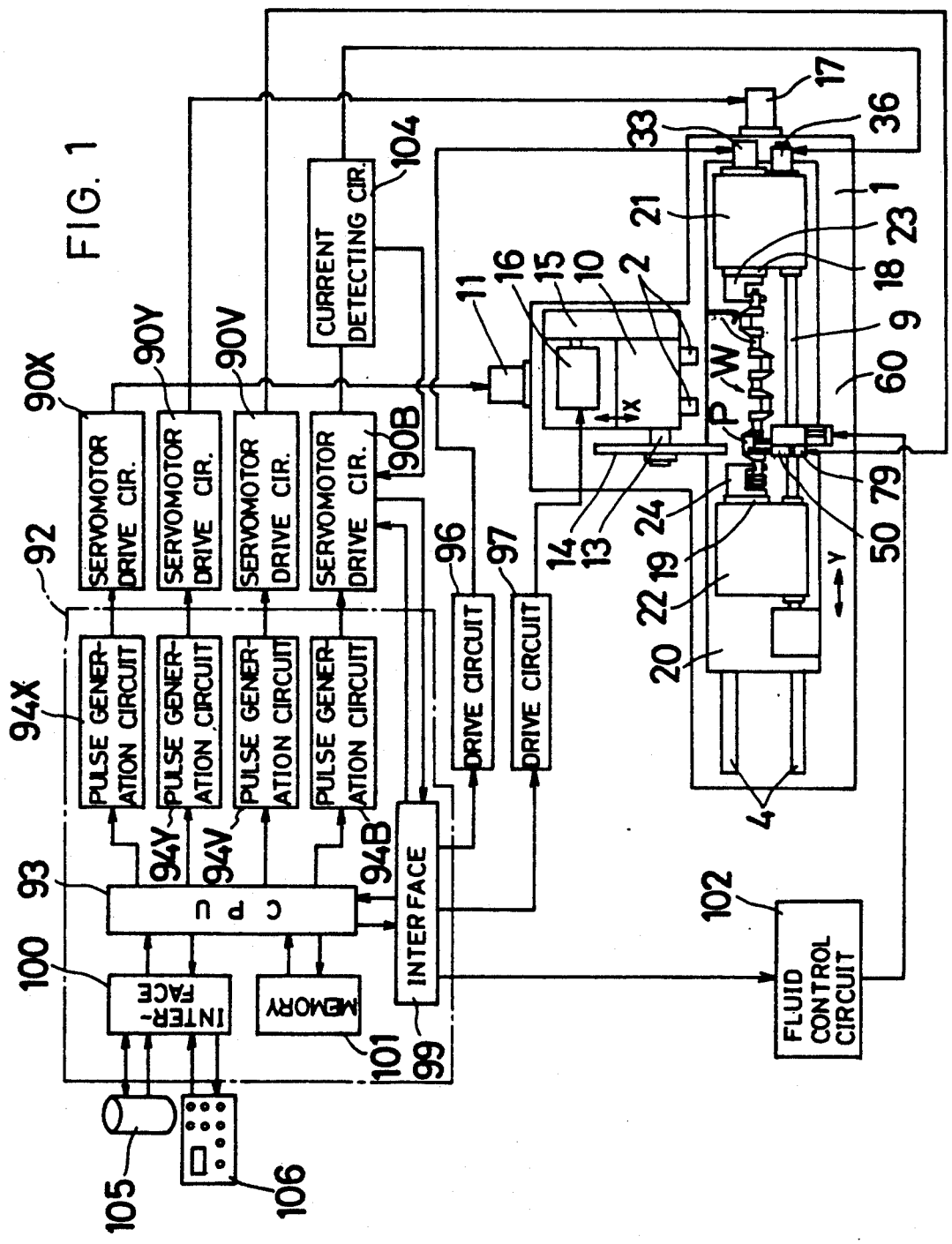
FIG. 1 is a schematic plan view of a pin grinder combined with a block diagram of a control circuit according to the present invention.
Figure 7:
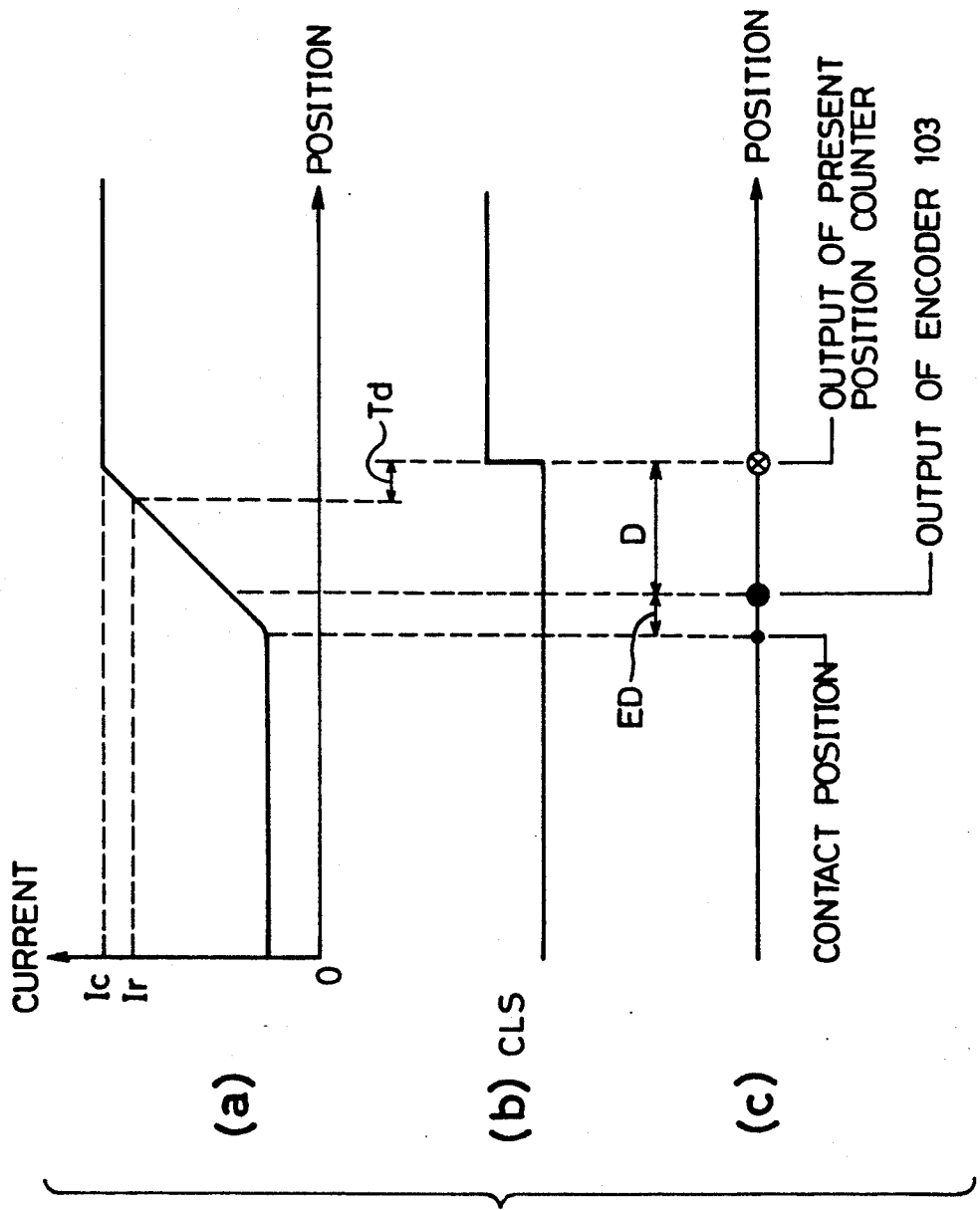

FIG. 4(a) and (b) are a flow chart illustrating the operation of the CPU shown in FIG. 1 for initial positioning operation;

FIG. 5 is a flow chart illustrating the operation of the CPU shown in FIG. 1 for machining operation;

FIG. 6 (a) through FIG. 6 (d) are explanatory charts explaining the positional relationships among the crankshaft, the rest shoe of the rest device and the engaging pin of the chucking device; and FIG. 7 (a) through (c) are charts of assistance in explaining the operation of the invention.

DETAILED DESCRIPTION OF THE PREFERRED EMBODIMENT

Referring now to the drawings and particularly, to FIG. 1 thereof, 1 is a bed of a pin grinder on which a grinding wheel 10 and a table 20 are mounted for movements in an X-axis direction and a Y-axis direction, respectively, which are intersecting each other. The wheel head 10 is moved by a feed servomotor 11 through a ball screw (not shown) for backward and forward movements in the X-axis direction along guide surfaces 2 formed on the bed 1. On the wheel head 10, a wheel spindle 13 is rotatably mounted to support a grinding wheel 14 thereon. The wheel spindle 13 is driven by a wheel drive motor 16 through a belt transmission mechanism 15 connected to the wheel spindle 13.

Figure 2:
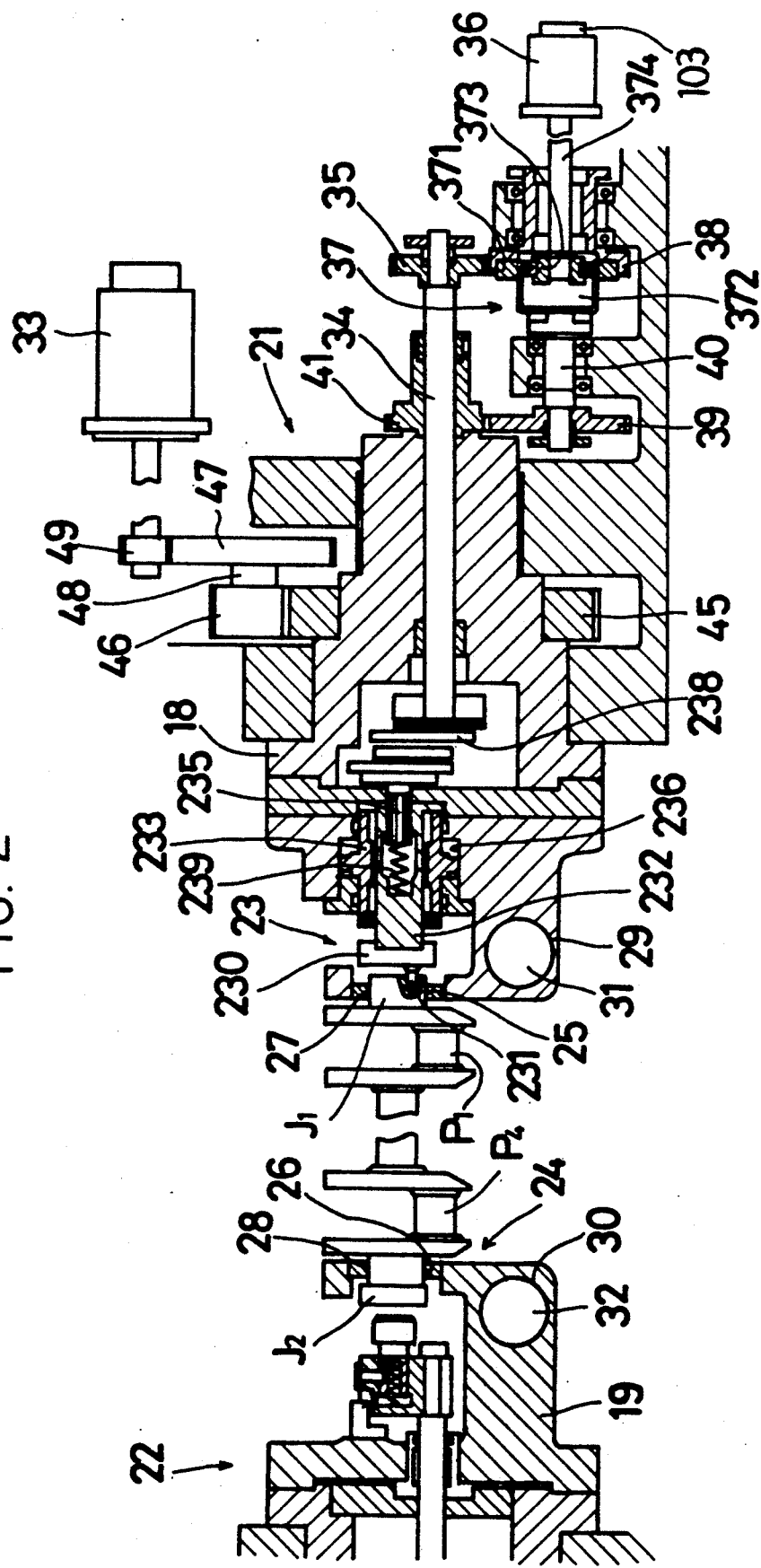
FIG. 2 is an enlarged sectional view of the spindle heads of the pin grinder shown in FIG. 1.

On the other hand, the table 20 is moved by a servomotor 17 through a ball screw (not shown) for movement in the Y-axis direction along guide surfaces 4 formed on the bed 1. On the table 20, a first spindle head 21 and a second spindle heads 22 facing each other are mounted, and work spindles 18 and 19 are supported by these spindle head 21 and 22. These spindles 18 and 19 are provided with eccentric chucking devices 23 and 24, respectively, which have journal supporting members 25 and 26 in order to support the journals portions J1 and J2 of a crankshaft W at an eccentric position with respect to the rotational axis of the spindles 18 and 19, as shown in FIG. 2. The chucking devices 23 and 24 are also provided with clamp arms 27, 28 for clamping the journal J1 and J2, respectively, with respect to respective chucking devices 23 and 24. The clamp arms 27, 28 are pivoted on the chucking devices 23 and 24, respectively, for opening and closing movements, and one end of the clamp arms 23 and 24 are connected to pistons 31 and 32, respectively, which are received within clamping cylinders 29 and 30 formed in the chucking devices 23 and 24, respectively.

The spindle 18 supported on the first spindle head 21 is drivingly connected to a spindle drive motor 33 through a gear train composed of gears 45 secured to the spindle 18, gears 46 and 47 fixed on an idle shaft 48 and a gear 49 connected to the output shaft of the spindle drive motor 33, so that a rotational torque is transmitted from the spindle drive motor 33 to the spindle 18. On the other hand, a part of the rotational torque is transmitted from the spindle drive motor 33 to the spindle 19 supported on the second spindle head 22 through a synchronization shaft 9 connecting the main spindles 18 and 19.

An indexing mechanism for indexing the crankshaft W will now be explained. The chucking device 23 is provided with an indexing member 230 having a engaging pin 231 engageable with an engagement hole Wh of the crankshaft W. The indexing member 230 is fixed to the front end of a rotary shaft 232, which is arranged at an eccentric position with respect to the rotational axis of the spindle 18, and penetrates a piston 233 in an axial direction parallel to the rotational axis of the spindle 18. The other end of the rotary shaft 232 is spline-engaged with a drive shaft 235, which is drivingly connected to an indexing shaft 34 through a coupling 238. The piston 233 is received by a cylinder 236 formed within the chucking device 23 for axial movement. The rotary shaft 232 is formed with a flange portion engageable with the rear end surface of the piston 233 and a cylindrical cavity which is spline-engaged with the drive shaft 235 and receives a compression spring 239 for applying to the rotary shaft 232 an axial force toward the crankshaft W. Therefore, when the piston 233 is moved to its backward position, the indexing member 230 is moved to a first position in which the engaging pin 231 is disengaged from the hole Wh of the crankshaft W. On the contrary, when the piston 233 is moved to its forward position, the indexing member 230 is moved to a second position in which the engaging pin 231 is engageable with the hole Wh.

The indexing shaft 34 is arranged at the radial center of the spindle 18 in order to be aligned with the rotational axis of the spindle 18, and penetrates the spindle 18 in the axial direction. At the rear end of the indexing shaft 34, a gear 35 is secured which is meshed with a first gear 38 rotatably supported on the first spindle head 21. Also, a connecting shaft 40 parallel to the indexing shaft 34 is rotatably mounted on the first spindle head 21 in order to fixedly support a second gear 39 which is meshed with a gear 41 fixed to the rear end of the spindle 18. The first gear 38 is connected to the output rotary member 371 of a well known differential gear mechanism 37 such as Harmonic Drive (trade name), while the connecting shaft 40 is connected to the intermediate rotary member 372 of the differential gear mechanism 37. Further, the input rotary member 373 of the differential mechanism 37 is connected to an indexing servomotor 36 through a shaft 374.

In the above indexing mechanism, the indexing shaft 34 is rotated at the same speed as that of the spindle 18 when the indexing motor 36 is stopped. Namely, in this case, a rotational torque is transmitted from the spindle drive motor 33 to the indexing shaft 34 through the gears 41 and 39, the connecting shaft 40, the differential gear mechanism 37 and the gears 38 and 35, and the rotational speed of the indexing shaft 34 becomes equal to that of the spindle 18. Therefore, the indexing member 230 is not rotated with respect to the chucking device 23. On the contrary, when the spindle 18 is stopped and the indexing motor 36 is rotated, a rotational torque is transmitted from the indexing servomotor 36 to the indexing shaft 34, thereby the indexing member 230 is rotated with respect to the chucking device 23.

Figure 3:
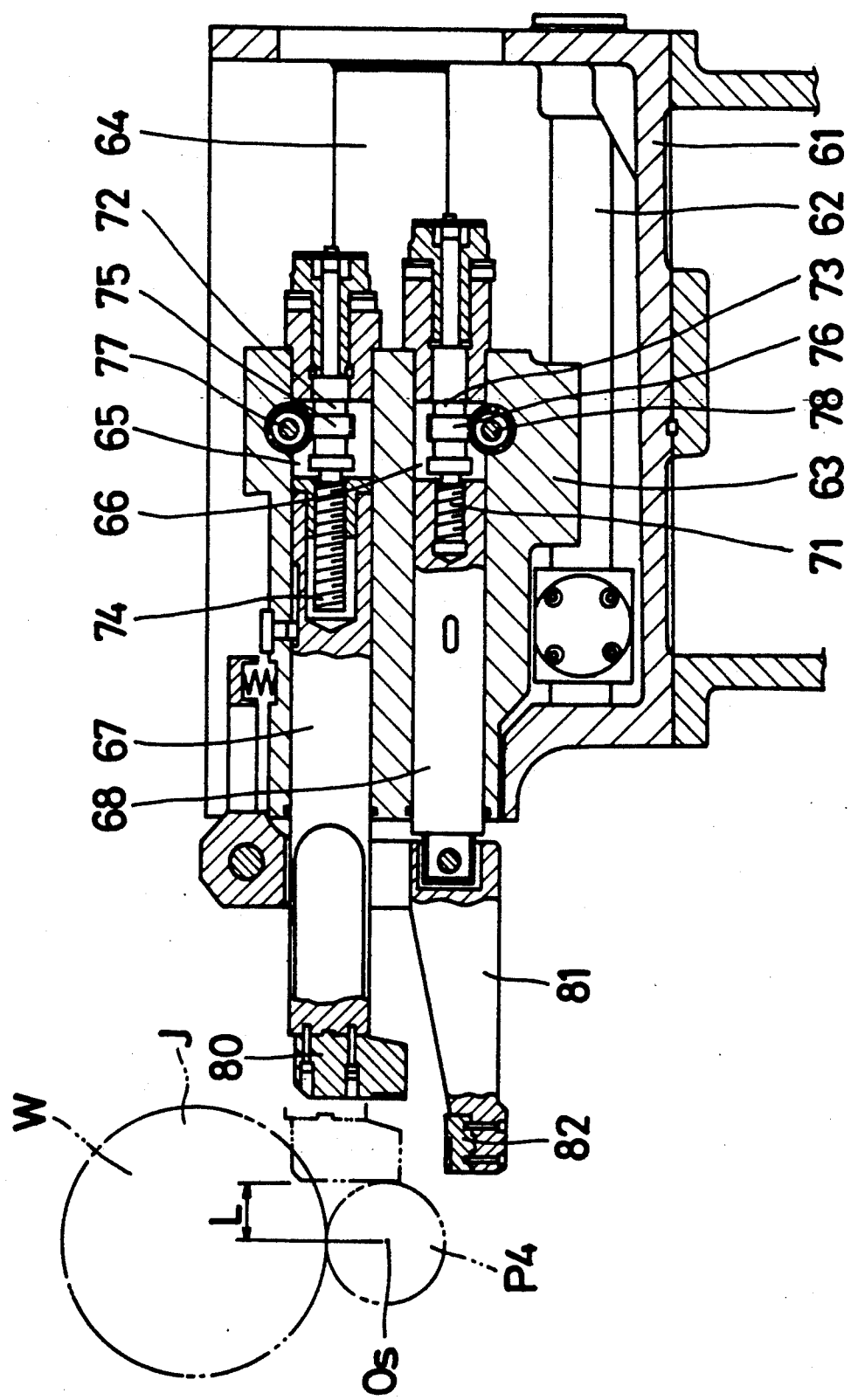
FIG. 3 is an enlarged sectional view of the rest device of the pin grinder shown in FIG. 1.

Furthermore, in addition to the grinding head 10 and the table 20, a rest device 60 is mounted on the bed 1 opposite to the grinding head 10. The rest device 60 supports a measuring device 50 as well as a well known rest-shoe feed mechanism. The rest device 60 is provided with a rest base 61 which supports a supporting slide 63 through a pair of guide bars 62 and 64, as shown in FIG. 3. The supporting slide 63 is moved by a rapid feed cylinder (not shown) to be moved at a predetermined rapid speed in a direction pallet to the X-axis direction. In the supporting slide 63, a pair of guide holes 65 and 66 are formed at different vertical locations in order to guide a pair of slide shafts 67 and 68, whose front ends project toward the wheel head 10. Further, a pair of rotation shafts 72 and 73 are supported at the rear ends of the guide holes 65 and 66 through fine adjustment mechanisms in order to be aligned with the slide shafts 67 and 68. These rotational shafts 72 and 73 are formed at their front ends with male screws 71 and 74 which engage with female screws formed at the rear end portions of the slide shafts 67 and 68, respectively. At the axially mid portions of the rotational shafts 72 and 73, worm wheels 75 and 76 are fixed thereto, which are meshed with worm gears 77 and 78, respectively.

The worm gears 77 and 78 are connected to rest feed servomotors through respective gear trains. Only the servomotor 79 for rotating the worm gear 77 is shown in FIG. 1. An upper contact shoe 80 (limit means) to the front end of the slide shaft 67, while a lower contact shoe 82 is fixed to an arm 81 which is moved by the slide shaft 68. The arm 81 has a reversed L shape, and the upper end portion of the arm 81 is pivoted on the supporting slide 63 for swing movement in a vertical plane parallel to the X-axis direction, while the corner portion of the arm 81 is pivoted at the front end of the slide shaft 68.

The servomotors 11 and 17, the rest feed servomotor 79 and the indexing servomotor 36 are connected to the servomotor drive circuits 90X, 90Y, 90V and 90B, respectively, so as to be rotated in accordance with command signals from the numerical control apparatus 92. The drive circuits 90X through 90B are connected to a CPU (Central Processing Unit) 93 of the numerical control apparatus 92 via pulse generation circuits 94X through 94B, respectively. Also, connected to the CPU 93 are a memory 101 and interface circuits 99 and 100. The wheel drive motor 16 and spindle drive motor 33 are connected to the interface circuit 99 via drive circuits 96 and 97, while the rapid feed cylinder of the rest device 60 is connected to the interface circuit 99 via a fluid control circuit 102. This fluid control circuit 102 also controls oil flows to the cylinders 29, 30 and 236 of the chucking devices 22 and 23. An outside memory device 105 and a data input/output device 106 are connected to the interface circuit 100.

Further, servomotors 11, 17, 36 and 79 are provided with encoders in order to output feedback pulses to respective servomotor drive circuits 90X through 90B. Only the encoder 103 for the indexing servomotor 36 (B-axis) is shown in FIG. 2. The encoder 103 is of an absolute type which outputs absolute position data indicating the position of indexing member 230 in the machine coordinate system, as well as regular feedback pulses. Moreover, a current detecting circuit 104 is interposed between the servomotor drive circuit 90B and the indexing servomotor 36, as load detection means, in order to output to the servomotor drive circuit 94B a signal proportion to the current applied to the indexing servomotor 36. The servomotor drive circuit 94B has a current limit operation mode as well as a regular control mode, and the control mode is changed in accordance with a mode instruction from the CPU 93. In the current limit operation mode, a current supplied to the indexing servomotor 36 is controlled not exceed a predetermined control current level Ic. Further, the servomotor drive circuit 90B outputs a signal CLS to the CPU 93 with a predetermined time delay, when the current applied to the indexing servomotor 36 exceeds a predetermined reference level Ir, which is slightly smaller than the control current level Ic.

Figure 4:
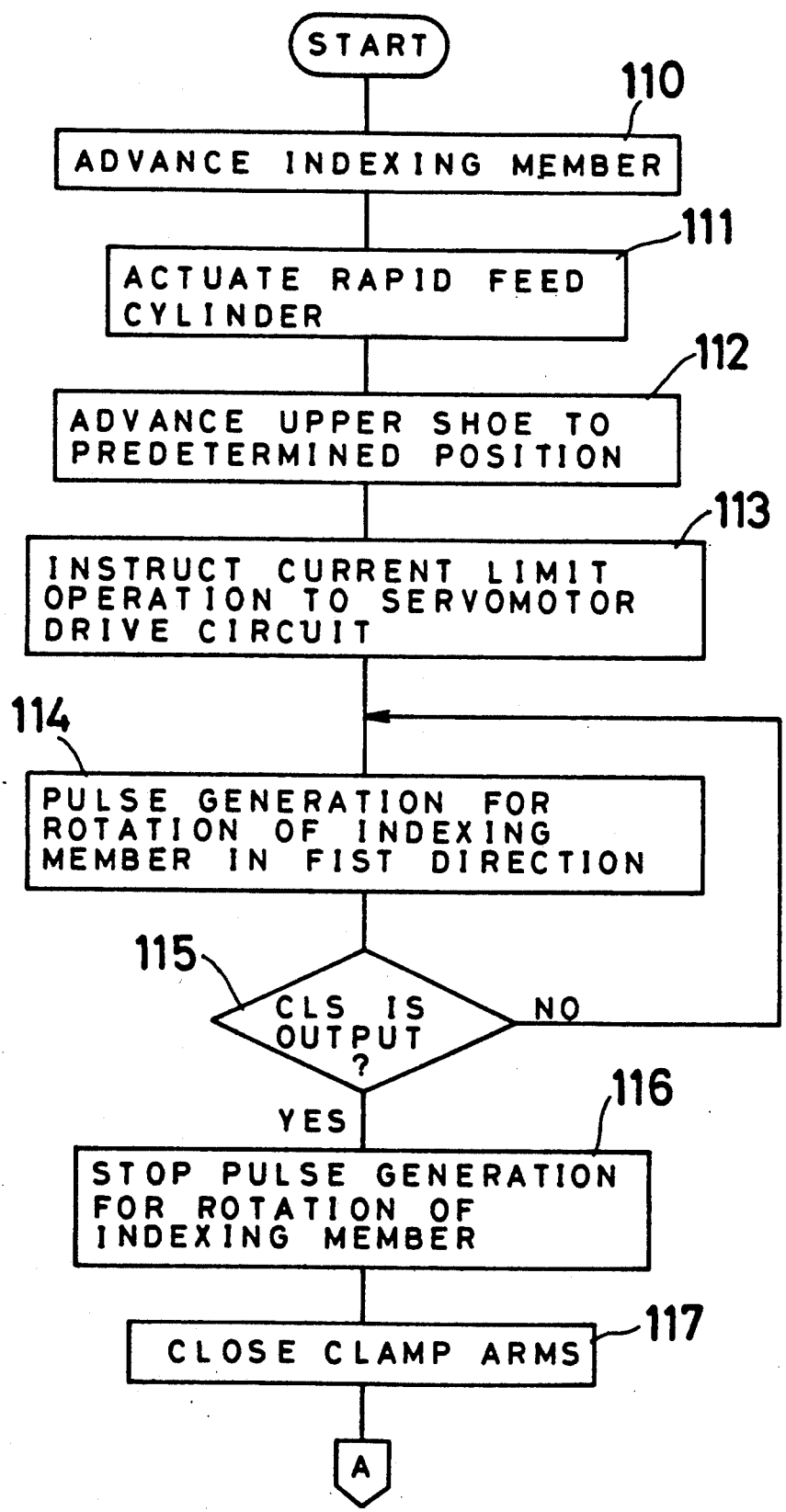
Figure 4:
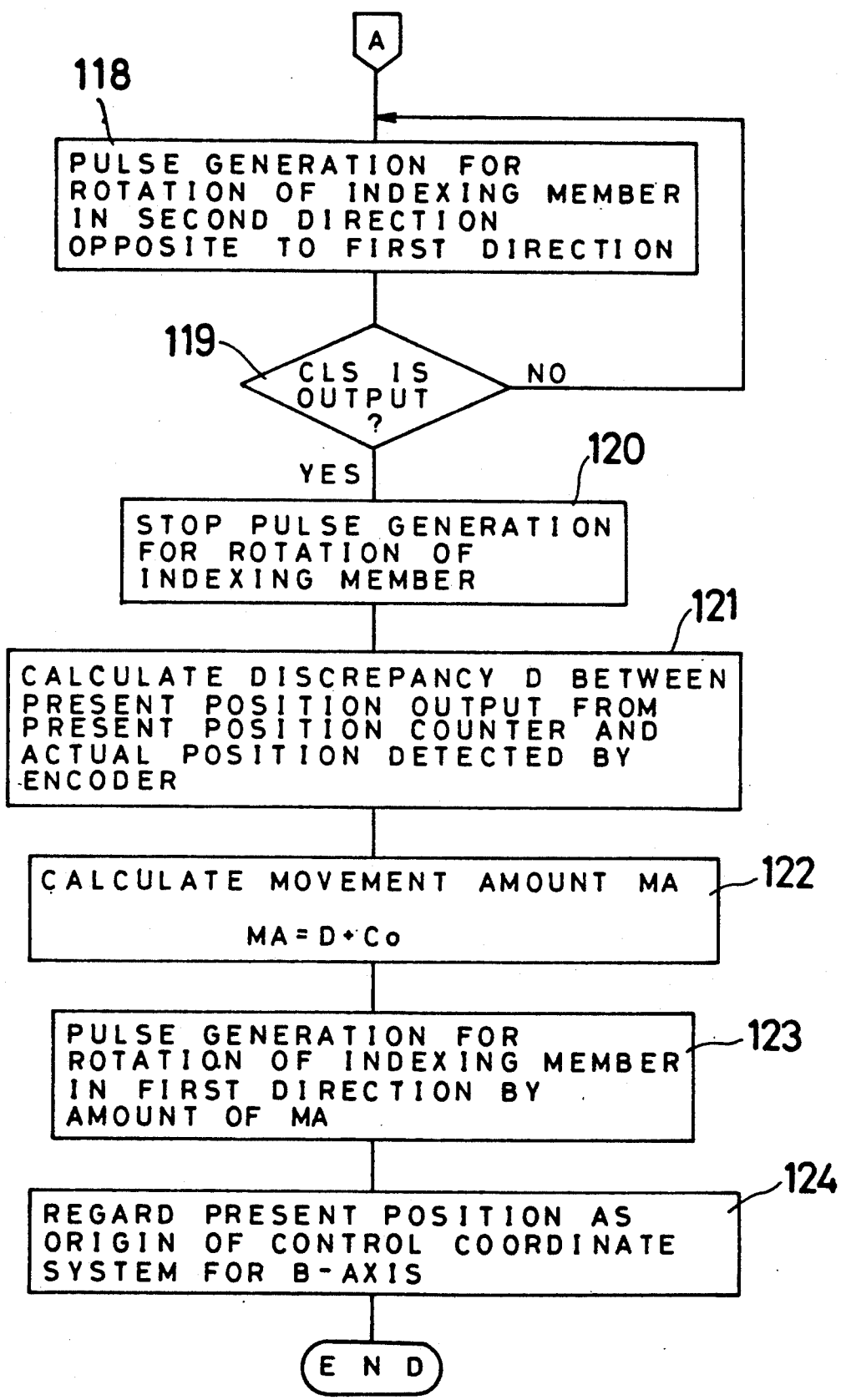
Figure 6B:
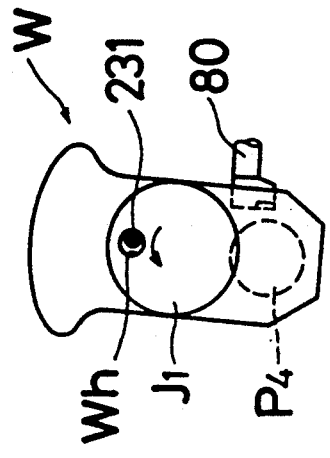
Figure 6D:
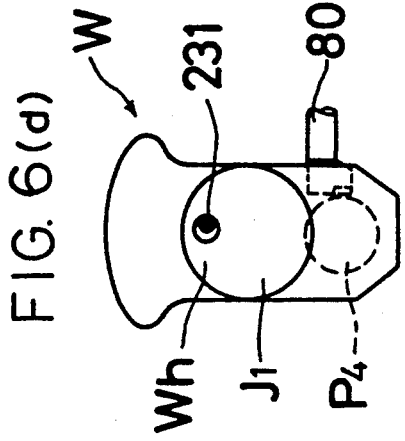
Figure 6A:
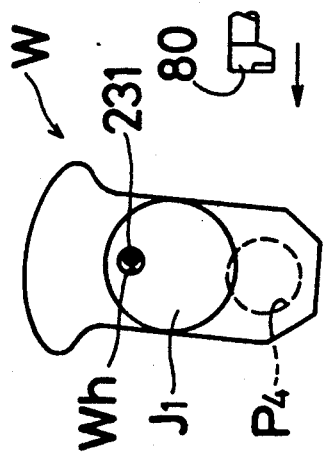
Figure 6C:
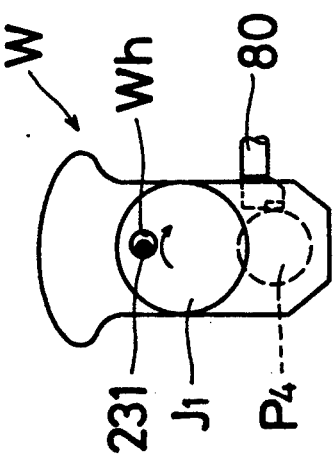

The operation of the above-mentioned pin grinder for initial positioning will now be explained with reference to a flow charts shown in FIG. 4 (a) and FIG. 4 (b). When a machining command is applied to the CPU 93 after a loading operation of the crankshaft W onto the chucking devices 23 and 24, the CPU 93 executes a program corresponding to the flow chart shown in FIGS. 4 (a) and 4 (b). At a first step 110, a command signal is output to the fluid control circuit 102 so as to move the piston 233 in the cylinder 236 from its backward position to its forward position. As a result, the indexing member 230, i.e., the engaging pin 231 is moved toward the journal portion J1 of the crankshaft W. Since the crankshaft W is placed on the chucking devices 23 and 24 with such an angular position that the hole Wh of the crankshaft W faces the engaging pin 231, the engaging pin 231 is inserted into the hole Wh of the crankshaft W when the cylinder 236 is moved to the forward position. As is understood from FIG. 6 (a), a clearance is produced between the engaging pin 231 and the hole Wh after the insertion of the engaging pin 231, because the diameter of the engaging pin 231 is slightly smaller than that of the hole Wh.

At the next step 111, the rapid feed cylinder 64 is actuated by the fluid control circuit 102 in response to a command signal from the CPU 93, so that the rest shoes 80 and 81 are advanced at a rapid speed toward a pin portion P4 of the crankshaft W. Thereafter, the CPU 93 instruct the pulse generation circuit 94V to generate the command pulses to the servomotor drive circuit 90V in accordance with a programmed feed amount, at step 112. As a result, the rest feed servomotor 79 is rotated so as to advance the upper shoe 80 toward the pin portion P4 by an amount corresponding to the programmed feed amount. After this operation, the upper rest shoe 80 is positioned in such location that the contact surface of the upper shoe 80 is located away from the rotational axis Os of the spindle 18 by an amount equal to the radius L of the pin portions.

At a next step 113, the CPU 93 outputs a command signal causing the servomotor drive circuit 90B to change its control mode from the regular operation mode to the current limit operation mode. The CPU 93 thereafter commands the pulse generation circuit 94B to generate a predetermined number of minus pulses to the servomotor drive circuit 90B, at step 114. In this embodiment, one minus pulse is generated at a time. Thereafter, the CPU 93 checks whether or not a signal CLS is output from the servomotor drive circuit 90B, thereby judging whether or not the current supplied to the indexing servomotor 36 exceeds a predetermined reference current level Ir. The reference current Ir is preset to such a value that the amplitude of current applied to the indexing servomotor 36 does not exceed the reference current Ir during rotation of the indexing member 230, but exceeds the reference current Ir when the rotation of the indexing motor 36 is prevented by an external force. If the current does not reach the reference current Ir, the processing moves back to step 114 in order to repeat the processing at the steps 114 and 115. With this operation, the indexing servomotor 36 is rotated in a first direction. On the contrary, if the current exceeds the reference current Ir, the processing moves from step 114 to 116 in order to stop the pulse generation for the rotation of the indexing servomotor 36.

Since the indexing servomotor 36 is not prevented from rotation at that time, the steps 114 and 115 are repeated to continuously rotate the servomotor 36. The rotation of the indexing servomotor 36 causes a rotation of the indexing member 230, thereby causing a rotation of the crankshaft W in a first direction as indicated by an arrow in FIG. 6 (b). By the rotation of the crankshaft W, the pin portion P4 is moved from its original position toward the upper shoe 80.

When the pin portion P4 engages with the upper shoe 80 as that further rotation is prohibited, the current applied to the indexing servomotor 36 exceeds the reference current Ir, as shown in FIG. 7 (a), thereby causing the servomotor drive circuit 90B to output the signal CLS with a predetermined time delay Td as shown in FIG. 7 (b). When the CPU 93 detects the signal CLS at the step 115, the pulse generation for rotation of the indexing servomotor 36 is stopped at step 116. As a result, the left side surface of the engaging pin 231 is engaged with the hole Wh as viewed in FIG. 6 (c) and a clearance is produced between the right side surface of the engaging pin 231 and the hole Wh.

After the above operation, the CPU 93 instructs the fluid control circuit 102, at step 117, to actuate the clamp pistons 31 and 32 so as to close the clamp arms 27 and 28, respectively, so that the angular position of the crankshaft W is fixed with respect to the chucking devices 22 and 23. After that the CPU 93 instructs the pulse generation circuit 94B to distribute plus pulses to the servomotor drive circuit 90B, at step 118, so that the indexing motor 36 is rotated in a second direction opposite to the first direction, as illustrated by an arrow in in FIG. 6 (c). When the right side surface of the engaging pin 231 is engaged with the hole Wh (also limit means) so that further rotation is prohibited, as shown in FIG. 6 (d), the amplitude of current supplied to the indexing servomotor 36 exceeds the reference current Ir. As a result, the processing moves from step 119 to step 120 in order stop the pulse generation.

Although the above rotation in the second direction eliminates a backlash in a transmission mechanism connecting the indexing servomotor 36 and the indexing member 230 and a clearance between the engaging pin 231 and the hole Wh of the crankshaft W, the components in the transmission mechanism such as the indexing shaft 34 are in twisted conditions caused by the rotational torque of the indexing motor 36. Therefore, the indexing member 34 or the crankshaft W would be rotated by the elastic force of the components when the clamp arms 27 and 28 are opened, if the elastic distortion of the components were not eliminated. Therefore, the elastic distortion must be eliminated at this stage. Furthermore, since the pulse generation is not stopped until the CLS signal is output from servomotor drive circuit 90B, even after the right side of the engaging pin 231 engages with the hole Wh, a discrepancy D is produced between the present position of the indexing member 230 counted by the absolute present position counter formed in the memory 101 and the actual absolute position thereof detected by the encoder 103, as illustrated in FIG. 7 (c). To obviate above-mentioned problem, a compensation operation is executed at steps 121 through 123.

Namely, the discrepancy D is calculated at the step 121, and a compensational movement amount MA is calculated by adding a constant value Co to the calculated discrepancy D. The constant value Co is a value equal to or slightly smaller than the amount of elastic distortion ED of the torque transmission mechanism in the rotational direction. Thereafter, the minus pulses, the number of which corresponds to the movement amount MA, is distributed to the servomotor drive circuit 90B, at step 123. As a result, the elastic distortion of the torque transmission mechanism is eliminated, while discrepancy between the present position counted by the present position counter and the actual position detected by the encoder 103.

Thereafter, a second present position counter for the control coordinate system of B-axis, which is formed in the memory 101, is reset to zero at step 124, so that the present position of the indexing member 230 is regarded as the origin of the control coordinate system for B-axis. The contents of the second present position counter is always updated in response to the pulse generation for the indexing servomotor 36, so that the contents of the present position counter indicates the present position of the indexing member 23 in the control coordinate system.

After above initial indexing operation, a machining program corresponding to a flow chart shown in FIG. 5 is executed in order to grind plural pin portions P1 through P4. At a first step 130, the CPU 93 commands the pulse generation circuit 94X to generate pulses to the servomotor drive circuit 90X in accordance with a predetermined grinding cycle. As a result, the wheel head 10 is advanced by a rotation of the servomotor 11, so that the pin portion P4 is first ground to a programmed finish size. In this grinding operation, the rest device 60 and measuring device 50 are used.

After that, the table 20 is moved to a next grinding position for the pin portion P1 which is located at same angle position as that of the pin portion P4, and the grinding cycle is then executed at step 132 for grinding the pin portion P1.

At the next step 133, the table 20 is again moved to a next grinding position for the pin portion P2, whose angular position is different from that of the pin portions P1 and P4 by 180 degrees. After this table index, the CPU 93 commands the fluid control circuit 102 to open the clamp arms 27 and 28, at step 134, and then commands the pulse generation circuit 94b to generates plus pulses corresponding the angle difference of 180 degrees. Namely, since the angular position of the pin portions P2 and P3 differs from that of the pin portions P1 and P4 by 180 degrees, data indicating 180 is programmed as the absolute angle position for pin portions P2 and P3. In the step 135, the CPU 93 reads out the programmed angle position of the pin portions P1 and P4 as a target position, and then calculates a difference between the target position and the second present position counted by the present position counter in order to obtain a rotational amount of the indexing member 230. In this case, 180 is obtained as the rotational amount since the target position is 180 degrees and the present position is zero degree in the control coordinate system.

As the result of the pulse generation at the step 135, the indexing member 230 is rotated in the second direction by the amount of 180 degrees. Since backlash in the rotational torque transmission mechanism and clearance between the engaging pin 231 and the hole Wh of the crankshaft W are eliminated by the operation at steps 118 and 119, the crankshaft W is accurately rotated by 180 degrees regardless of the backlash and the clearance, so that the pin portion P2 is accurately positioned in the machining position, in which the pin portion P2 is aligned with the spindle 18. After this index operation, the clamp arms 27 and 28 are closed again at step 136. After that pin portion P2 are ground at step 137, and then pin portion P3 are ground at step 139 after another table index at step 138.

In the event that the engaging pin 231 does not face the hole Wh of the crankshaft W after the loading operation of the crankshaft W, an additional step would be executed between the step 110 and 111, in which the indexing member 230 is rotated in the first and second directions by a predetermined amount in order to enable the engaging pin 231 to engage with the hole Wh.

Although the upper shoe of the rest device is used as a reference member for initial indexing operation in the above-mentioned embodiment, a reference member fixed on a chucking device as shown in Japanese unexamined patent application 60-118403 can be used as the reference member.

Obviously, numerous modifications and variations of the present invention are possible in light of the above teachings. It is therefore to be understood that within the scope of the appended claims, the present invention may be practiced otherwise than as specifically described herein.

What is claimed is:

1. A method for indexing a crankshaft supported by a chucking device of a machine tool, wherein said chucking device is provided with a journal supporting member for supporting a journal portion of said crankshaft at an eccentric position with respect to the rotational axis of a work spindle, an indexing member rotatably supported on said chucking device and having an engaging member engaging with one end of said crankshaft for rotational torque transmission, indexing motor means for generating a rotational torque, a rotational torque transmission mechanism for transmitting the rotational torque from said indexing motor means to said indexing member and a clamp mechanism for clamping said crankshaft with respect to said chucking device, said method comprising:
   a step for placing said crankshaft in a predetermined reference angular position;
   a step for clamping said crankshaft with respect to said chucking device by actuating said clamp mechanism;
   a step of providing limit means for limiting a rotational angle of said indexing motor means;
   a step for rotating said indexing motor means in a predetermined direction until further rotation is limited by said limit means, so that the load of said indexing motor means exceeds a predetermined level; and
   a step for regarding the present position of said indexing member as the origin of a coordinate system for rotation of said indexing member.

2. An indexing method as set forth in claim 1, said method further comprises a step for further rotating said indexing motor means, after the rotation in said rotating step, in a second direction opposite to said predetermined direction by an amount corresponding to an amount of elastic distortion of said rotational torque transmission mechanism in the rotational direction produced in said rotating step.

3. A method for indexing a crankshaft supported by a chucking device of a machine tool, wherein said chucking device is provided with a journal supporting member for supporting a journal portion of said crankshaft at an eccentric position with respect to the rotational axis of a work spindle, an indexing member rotatably supported on said chucking device and having an engaging member engaging with one end of said crankshaft for rotational torque transmission, indexing motor means for generating a rotational torque, a rotational torque transmission mechanism for transmitting the rotational torque from said indexing motor means to said indexing member, a clamp mechanism for clamping said crankshaft with respect to said chucking device, and a reference member engageable with a reference portion of said crankshaft by a rotation of said crankshaft, said method comprising:

a step for placing said crankshaft in an angular position in which said reference portion of said crankshaft faces said reference member;

a step for rotating in a predetermined direction by rotating said indexing motor means in a first direction in order to rotate said indexing member until the reference portion of said crankshaft engages with said reference member, thereby positioning said crankshaft to a predetermined reference angular position;

a step for clamping said crankshaft with respect to said chucking device by actuating said clamp mechanism;

a step of providing limit means for limiting a rotational angle of said indexing motor means;

a step of further rotating said indexing motor means in a second direction opposite to said first direction, until further rotation is limited by said limit means, so that the load of said indexing motor means exceeds a predetermined level;

a step for regarding the present position of said indexing member as a reference angular position for further rotation;

a step for unclamping said crankshaft with respect to said chucking device by disabling said clamp mechanism; and a step for indexing said crankshaft by a rotation of said indexing motor means in said second direction from said reference angular position by a predetermined angle in order to position a pin portion of said crankshaft in a predetermined machining position aligned with the rotational axis of said work spindle.

4. An indexing method as set forth in claim 3, said further rotating step comprises;

a step for rotating said indexing motor means in said second direction;

a step for detecting the load of said indexing motor means;

a step for judging whether of not the detected load exceeds a predetermined level; and a step for stopping the rotation of said indexing motor means when said detected load exceeds the predetermined level.

5. An indexing method as set forth in claim 3, said further rotating step further comprises a step for rotating said indexing motor means in said first direction by an amount corresponding to an amount of elastic distortion of said rotational torque transmission mechanism in the rotational direction produced in said rotating step.

6. An apparatus for indexing a crankshaft supported by a chucking device fixed to a work spindle of a machine tool, comprising;

a journal supporting member provided on said chucking device for supporting a journal portion of said crankshaft at an eccentric position with respect to the rotational axis of said work spindle;

an indexing member rotatably supported on said chucking device and having an engaging member engaging with one end of said crankshaft for transmission of rotational torque;

indexing motor means for generating a rotational torque;

a rotational torque transmission mechanism for transmitting the rotational torque from said indexing motor means to said indexing member;

a clamp mechanism for clamping said crankshaft with respect to said chucking device;

a reference member engageable with a reference portion of said crankshaft, said crankshaft being initially positioned in a predetermined reference angular position using said reference member;

clamp control means for actuating said clamp mechanism in order to clamp said crankshaft located in said reference angular position on said chucking device;

rotation control means for rotating said indexing motor means in a first direction until the load of said indexing motor exceeds a predetermined level;

indexing control means for rotating said indexing motor means in said first direction, under condition that said clamp mechanism is not actuated, so as to rotate said crankshaft from said reference angular position by a predetermined amount to position one of said pin portions at said machining position aligned with the rotational axis of said work spindle, wherein said rotation control means comprises;

load detection means for detecting the load of said indexing motor means;

judging means for judging whether or not the detected load exceeds a predetermined level; and stopping means for stopping the rotation of said indexing motor means when the detected load exceeds said level.

7. An indexing apparatus as set forth in claim 6, said indexing motor means is composed of a servomotor, and said load detection mean detects a current applied to said servomotor as the load of said servomotor.

8. An indexing apparatus as set forth in claim 6, said rotation control means comprises means for rotating said indexing motor means in a second direction opposite to said first direction by an amount corresponding to an amount of elastic distortion of said rotational torque transmission mechanism in the rotational direction produced in the rotation controlled by said rotation means.

9. An apparatus for indexing a crankshaft supported by a chucking device fixed to a work spindle of a machine tool, comprising;

a journal supporting member provided on said chucking device for supporting a journal portion of said crankshaft at an eccentric position with respect to the rotational axis of said work spindle;

an indexing member rotatably supported on said chucking device and having an engaging member engaging with one end of said crankshaft for rotational torque transmission;

indexing motor means for generating a rotational torque;

a rotational torque transmission mechanism for transmitting the rotational torque from said indexing motor means to said indexing member;

a clamp mechanism for clamping said crankshaft with respect to said chucking device;

a reference member engageable with a reference portion of said crankshaft by a rotation of said crankshaft;

rotation control means for rotating said indexing motor in a first direction so as to rotate said indexing member until said reference portion of said crankshaft is engaged with said reference member, thereby positioning said crankshaft to a predetermined reference angular position;

clamp control means for actuating said clamp mechanism after the engagement of said reference portion of said crankshaft with said reference member;

backlash eliminating means for rotating said indexing motor means in a second direction opposite to said first direction until the load of said indexing motor means exceeds a predetermined level;

indexing control means for rotating said indexing motor means in said second direction, under the condition that said clamp mechanism is not actuated, so as to rotate said crankshaft from said reference angle position by a predetermined amount to position one of said pin portions in a predetermined machining position aligned with said work spindle.

10. An indexing apparatus as set forth in claim 9, said rotation control means comprises;

load detection means for detecting the load of indexing motor means;

judging means for judging whether of not the detected load exceeds a predetermined level; and stopping means for stopping the rotation of said indexing motor means when the detected load exceeds said reference level.

11. An indexing apparatus as set forth in claim 10, said indexing motor means is composed of a servomotor, and said load detection means detects a current applied to said servomotor as the load.

12. An indexing apparatus as set forth in claim 10, said rotation control means comprises means for rotating said indexing motor means in a second direction opposite to said first direction by an amount corresponding to an amount of elastic distortion of said rotational torque transmission mechanism in the rotational direction produced in the rotation controlled by said rotation means.

13. An indexing apparatus as set forth in claim 9, said rotational torque transmission mechanism comprises a differential gear mechanism disposed on a spindle head, an input member of said differential gear mechanism being connected to said indexing motor means, an output member of said differential gear mechanism being connected to said indexing member, and an intermediate member of said differential gear mechanism being connected to said work spindle.

14. An apparatus for indexing a crankshaft supported by a chucking device fixed to a work spindle of a machine tool, comprising:

a journal supporting member provided on said chucking device for supporting a journal portion of said crankshaft at an eccentric position with respect to the rotational axis of said work spindle;

an indexing member rotatably supported on said chucking device and having an engaging member with one end of said crankshaft for transmission of rotational torque;

indexing motor means for generating a rotational torque;

a rotational torque transmission mechanism for transmitting the rotational torque from said indexing motor means to said indexing member;

a clamp mechanism for clamping said crankshaft with respect to said chucking device;

a reference member engageable with a reference portion of said crankshaft, said crankshaft being initially positioned in a predetermined reference angular position using said reference member;

clamp control means for actuating said clamp mechanism in order to clamp said crankshaft located in said reference angular position on said chucking device;

rotation control means for rotating said indexing motor means in a first direction until the load of said indexing motor exceeds a predetermined level;

indexing control means for rotating said indexing motor means in said first direction, under condition that said clamp mechanism is not actuated, so as to rotate said crankshaft from said reference angular position by a predetermined amount to position one of said pin portions at said machining position aligned with the rotational axis of said work spindle, wherein said rotational torque transmission mechanism comprises a differential gear mechanism disposed on a spindle head, an input member of said differential gear mechanism being connected to said indexing motor means, an output member of said differential gear mechanism being connected to said indexing member, and an intermediate member of said differential gear mechanism being connected to said work spindle.

* * * * *